United States Patent [19]
Griswold

[11] Patent Number: 5,406,974
[45] Date of Patent: Apr. 18, 1995

[54] AUTOMATIC FLUID FLOW CONTROL AND STRAINER DEVICE

[75] Inventor: David E. Griswold, Balboa Island, Calif.

[73] Assignee: Griswold Controls, Irvine, Calif.

[21] Appl. No.: 238,206

[22] Filed: May 4, 1994

Related U.S. Application Data

[63] Continuation of Ser. No. 35,450, Mar. 23, 1993, abandoned.

[51] Int. Cl.⁶ .................. B01D 35/02; B01D 35/16
[52] U.S. Cl. .................. 137/454.6; 137/549; 210/248; 210/430
[58] Field of Search .......... 137/454.6, 544, 546, 137/549; 210/248, 429, 430

[56] References Cited

U.S. PATENT DOCUMENTS

| | | | |
|---|---|---|---|
| 1,455,430 | 5/1923 | DeLuiz | 137/549 X |
| 1,697,865 | 1/1929 | Hahn et al. | 137/546 X |
| 1,860,004 | 5/1932 | Yardley | 137/549 X |
| 1,927,582 | 9/1933 | Denk | 137/549 X |
| 4,452,272 | 6/1984 | Griswold | 137/454.6 |
| 4,541,456 | 9/1985 | Troy | 137/549 |
| 4,550,896 | 11/1985 | Hansen, III | 137/549 X |
| 4,649,950 | 3/1987 | Bradley et al. | 137/549 |
| 4,827,974 | 5/1989 | Coulter | 137/549 |
| 4,917,535 | 4/1990 | Prassas | 405/36 |
| 5,088,518 | 2/1992 | Stamatakis et al. | 137/549 |
| 5,230,366 | 7/1993 | Marandi | 137/549 X |
| 5,301,710 | 4/1994 | Marandi | 137/15 |

Primary Examiner—John Rivell
Attorney, Agent, or Firm—Lyon & Lyon

[57] ABSTRACT

An automatic fluid flow control valve and strainer device which provides a constant flow rate of strained fluid despite varying differential pressures and employs a combination of a unitary body with an integrated, removable strainer assembly and a removable flow control valve assembly. The body is essentially in the shape of a "Y" and provides a compact valve with minimum threaded joints and access to the various components thereof with minimum disassembly. The removable strainer assembly is configured and arranged in a manner so that fluid flows from the outside to the inside of a cup-shaped strainer, allowing easier use and cleaning.

13 Claims, 4 Drawing Sheets

AUTOMATIC FLUID FLOW CONTROL AND STRAINER DEVICE

This is a continuation of application Ser. No. 08/035,450, filed on Mar. 23, 1993, now abandoned.

FIELD OF THE INVENTION

The present invention relates to fluid flow control devices, particularly automatic fluid flow control devices with integral strainers.

BACKGROUND

Fluid control devices are used to regulate fluid flow, so that fluid flowing into such a device will be output at a constant rate. Strainers are often used to filter out unwanted debris. Prior art devices many times comprise multiple components, which result in the following major drawbacks, namely, increased risk of leakage due to multiple connections, longer installation times, and increased space requirements.

Some valve devices integrate components into a unitary structure and have separate chambers for each major subassembly (See for example, Ser. No. 07/911,206 filed Jul. 9, 1992). Some incorporate a strainer, but the devices generally require disassembly in order to clean the strainer, and debris that collects on the inside of the strainer can be difficult to expel.

SUMMARY OF THE INVENTION

The automatic fluid flow control and strainer device of the present invention includes a pressure compensating flow control valve which provides for constant fluid flow through and out of the device, and a strainer assembly for straining fluids upon entering the device. These features are provided in a compact assembly which allows easy access for cleaning and/or replacing the strainer, as well as the flow control valve.

The novel design and construction of an automatic fluid flow control and strainer device according to the present invention provides a unitary body that offers the following advantages: (1) a compact construction where the strainer assembly and the fluid control assembly are integrated into a single subassembly, and (2) due to the orientation and design of the strainer assembly, debris is collected on the outer surface of the strainer assembly and can be dislodged and expelled through a port in the strainer assembly, without removing the strainer assembly.

Accordingly, a principal object of this invention is to provide an improved automatic fluid flow control device.

Another object is to provide a compact automatic fluid flow control valve and strainer device.

Another object is to provide an automatic fluid flow control valve and strainer device comprising a singular body.

Another object is to provide an improved automatic fluid flow control valve and strainer device that is configured to provide easy access to each assembly comprising the device.

Another object is to provide strained liquid at a selected flow rate regardless of the pressure of the liquid supplied.

The present invention relates to a fluid flow control valve including a strainer device that provides a constant fluid flow. The configuration of the body of the device provides for a compact size, easy flushing and cleaning, and easy access to the major subassemblies. The device may also include a sensing port for testing the pressure and/or temperature in the device.

Fluid flow into the device first encounters the strainer assembly. The strainer assembly includes a strainer which strains and filters the fluid to prevent contaminants from proceeding through the device. The particular shape and orientation of the strainer is important. It is cup shaped and the inlet fluid flows from the outside to the inside of the "cup". This arrangement enables contaminants to be easily flushed from the device through a strainer blow down orifice. The strained debris thus collects on the outer surface of the cup-shaped strainer, rather than within the "cup," thereby enabling a simpler and more efficient flushing. The strainer assembly is easily accessible and may be easily removed to allow for cleaning and/or replacement. Once the fluid passes through the strainer assembly, it encounters an automatic flow control valve.

The automatic flow control valve assembly is integrated into the same chamber as the strainer assembly and the inlet portion of the flow control valve assembly is encased in the strainer assembly. The flow control valve assembly provides for a constant fluid flow rate despite a varying differential pressure. A variety of flow control cartridges may be used in the flow control valve depending on the flow rate desired. Suitable automatic flow control cartridges are available from Griswold Controls, Irvine, Calif., which may be of the type disclosed for example in U.S. Pat. No. 3,752,183. Once the fluid passes through the flow control valve, it exits the device at a selected flow as determined by the cartridge used.

DETAILED DESCRIPTION OF THE PREFERRED EMBODIMENT

Figure 1B:
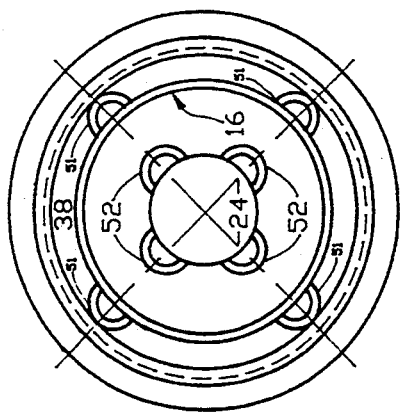
FIG. 1B is a cross-sectional view of the strainer assembly, taken along a line 1b—1b of FIG. 1A, showing the spatial relationship of the strainer element, the strainer blow down orifice, lugs that hold the strainer assembly, and a strainer chamber area.
Figure 1A:
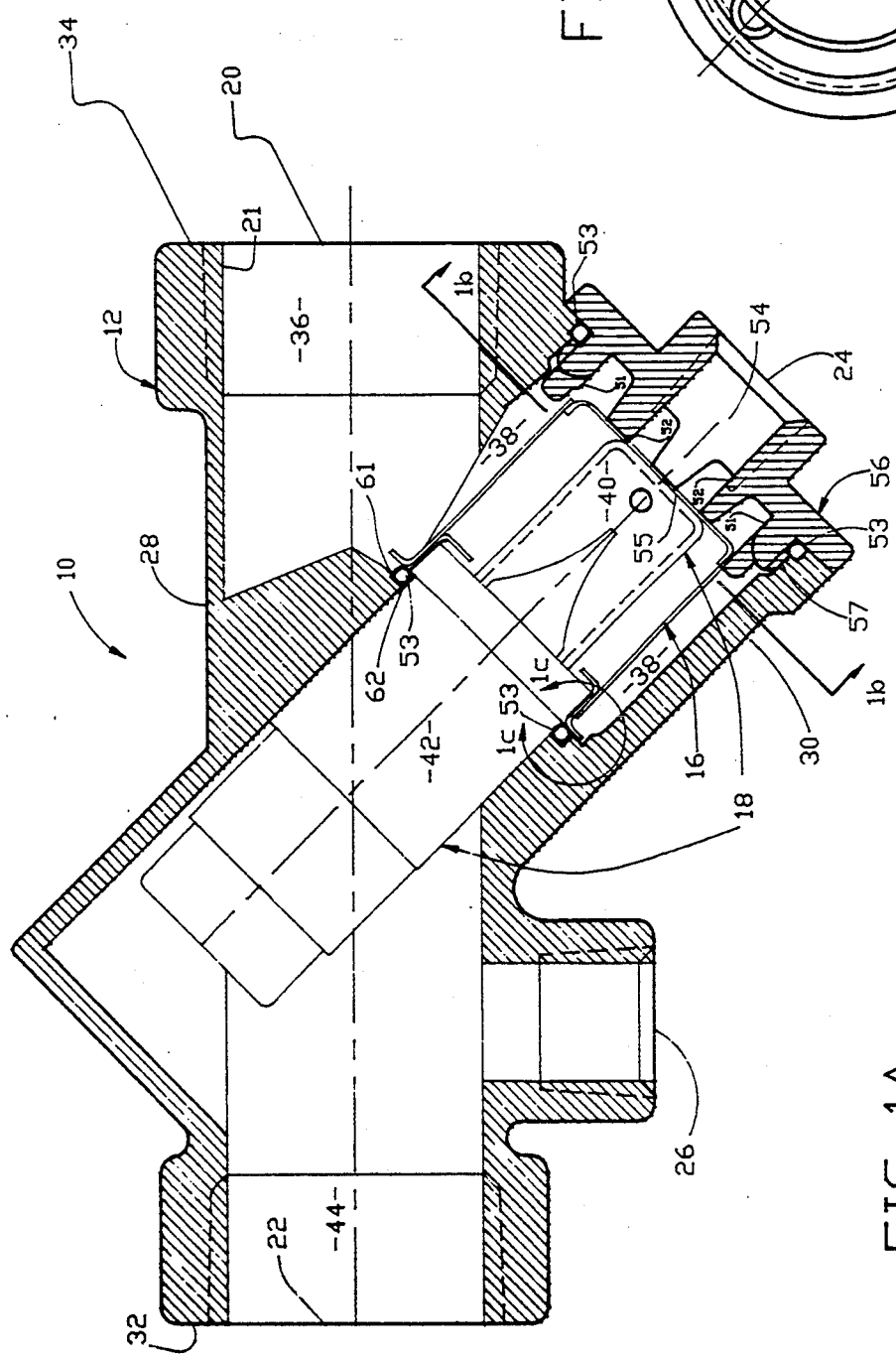
FIG. 1A is a cross-sectional view of a preferred embodiment of an assembled automatic fluid flow control and strainer device, illustrating the internal configuration of the device.
Figure 1C:
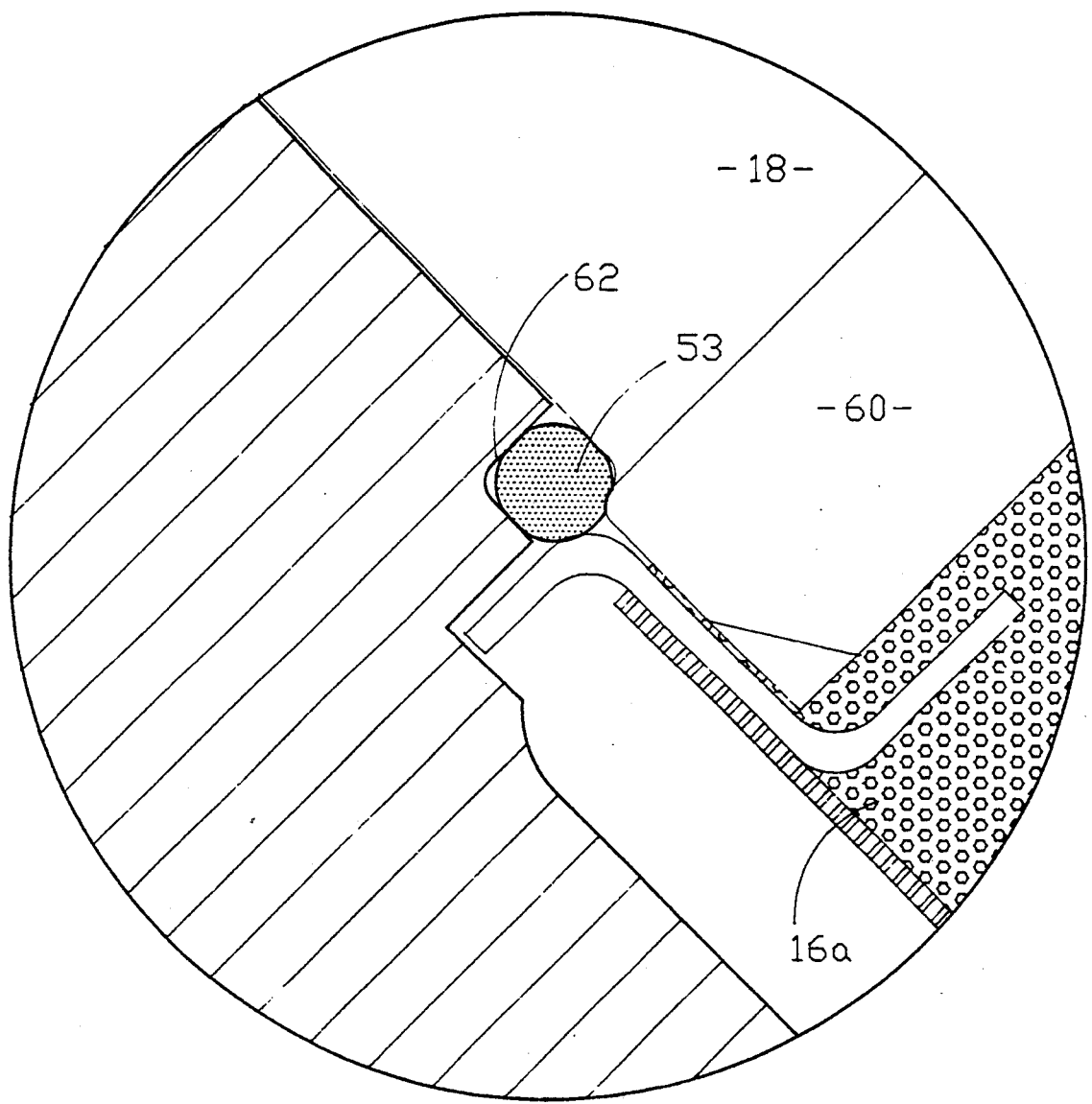
FIG. 1C is an exploded view of the attachment between the strainer assembly, the flow control valve assembly, and the valve body, taken along line 1c—1c of FIG. 1A.

Turning to the drawings, FIGS. 1A, 1B, 1C and 2 show a preferred embodiment of the present invention in the form of an automatic fluid flow control valve and strainer device 10. As best shown in FIG. 1A, the device 10 comprises three main components, namely a valve body 12, a removable strainer assembly 16, and a removable flow control valve assembly 18.

The valve body 12 includes four orifices: an inlet orifice 20, an outlet orifice 22, a strainer blow down orifice 24, and a sensing port 26. The valve body 12 also includes a top side 28, a bottom side 30, a left side 32, and a right side 34. The valve body 12 also comprises several internal channels and chambers for directing fluid flow through the device 10. These channels/chambers include an inlet channel 36, a strainer chamber area 38, a strainer flow area 40, a flow control valve channel 42, and an outlet channel 44.

The inlet channel 36 comprises the area where the fluid enters the device. The strainer chamber area 38 comprises the area outside the outer perimeter of the strainer assembly 16. The strainer flow area comprises the area on the inside of the strainer assembly 16, where the fluid passes before passing through the flow control valve assembly 18. The flow control valve channel 42 comprises the area of the flow control valve. The outlet channel 44 comprises the area where the fluid exits the device. The valve body 12 is configured generally in a "Y-pattern" configuration, where the inlet orifice and the combined removable strainer assembly 16 and removable flow control valve assembly form the upper parts of the "Y" (as shown in FIG. 1A, the "Y" is shown on its side, with the strainer/control valve portion on the bottom), and the outlet channel forms the base of the "Y" (ie, as viewed from the left in FIG. 1A).

The strainer assembly includes a strainer element and an O-ring. The strainer element is positioned on the upper part of the "Y" (bottom of FIG. 1A), and is shaped in the form of a cup, with the open end of the cup exposed to the base of the "Y", facing the flow control valve. This orientation allows for fluid to pass from the outside of the cup to the inside as it passes through the device to the flow control valve.

A description of the positioning and operation of the device 10 in a fluid flow system is helpful to understanding the detailed description given below. The device 10 is connected between two pipes or lines (not shown) with the inlet orifice 20 attached to a pipe or line which is to be regulated, and the outlet orifice 22 is attached to an outlet pipe. Turning to FIG. 1A, the general operation of the device 10 involves the following enumerated steps:

(1) A fluid flow of varying pressures enters the device 10 through the inlet orifice 20 at the right side 34.
(2) The fluid flow then enters the strainer chamber area 38 of the removable strainer assembly 16. There, the fluid encounters the strainer assembly 16. Fluid passes through the strainer assembly 16 which strains debris out of the fluid flow so it neither passes through, into the flow control valve assembly 18, nor out of the remainder of the device 10.
(3) Debris is collected on the outer surface of the strainer assembly 16 in the strainer chamber area 38.
(4) The strained fluid then passes through the strainer flow area 40 to the removable flow control valve assembly 18.
(5) The removable flow control valve assembly 18 automatically regulates the fluid flow such that the fluid exits at a constant, pre-selected, rate.
(6) The strained and regulated fluid flow then passes through the outlet channel 44 and the outlet orifice 22, and exits the device 10.
(7) Debris collected on the outside of the strainer can be expelled through the strainer blow down orifice 24 when it is opened for clearing the strainer.

Thus, the device 10 provides strained and automatically controlled fluid flow from fluid supplied at varying pressures in a compact and simple apparatus.

Turning now to a more detailed description of the preferred embodiment, fluid input into the device 10 enters at the inlet orifice 20 from the pipe or line (not shown) which is to be regulated. The inlet orifice housing 21 is connected to the input line or pipe by conventional methods. The inlet orifice 20 defines an inlet channel 36, both of which preferably are aligned along a common axis with the outlet orifice 22 and the outlet channel 44.

Fluid flows from the inlet channel 36 to the strainer chamber area 38 and encounters the removable strainer assembly 16. The removable strainer assembly 16 and the removable flow control valve assembly 18 are mounted along a common axis. The axis of the strainer/valve assembly is acutely angled downward from the axis of the inlet channel 36 and the outlet channel 44.

Figure 2:
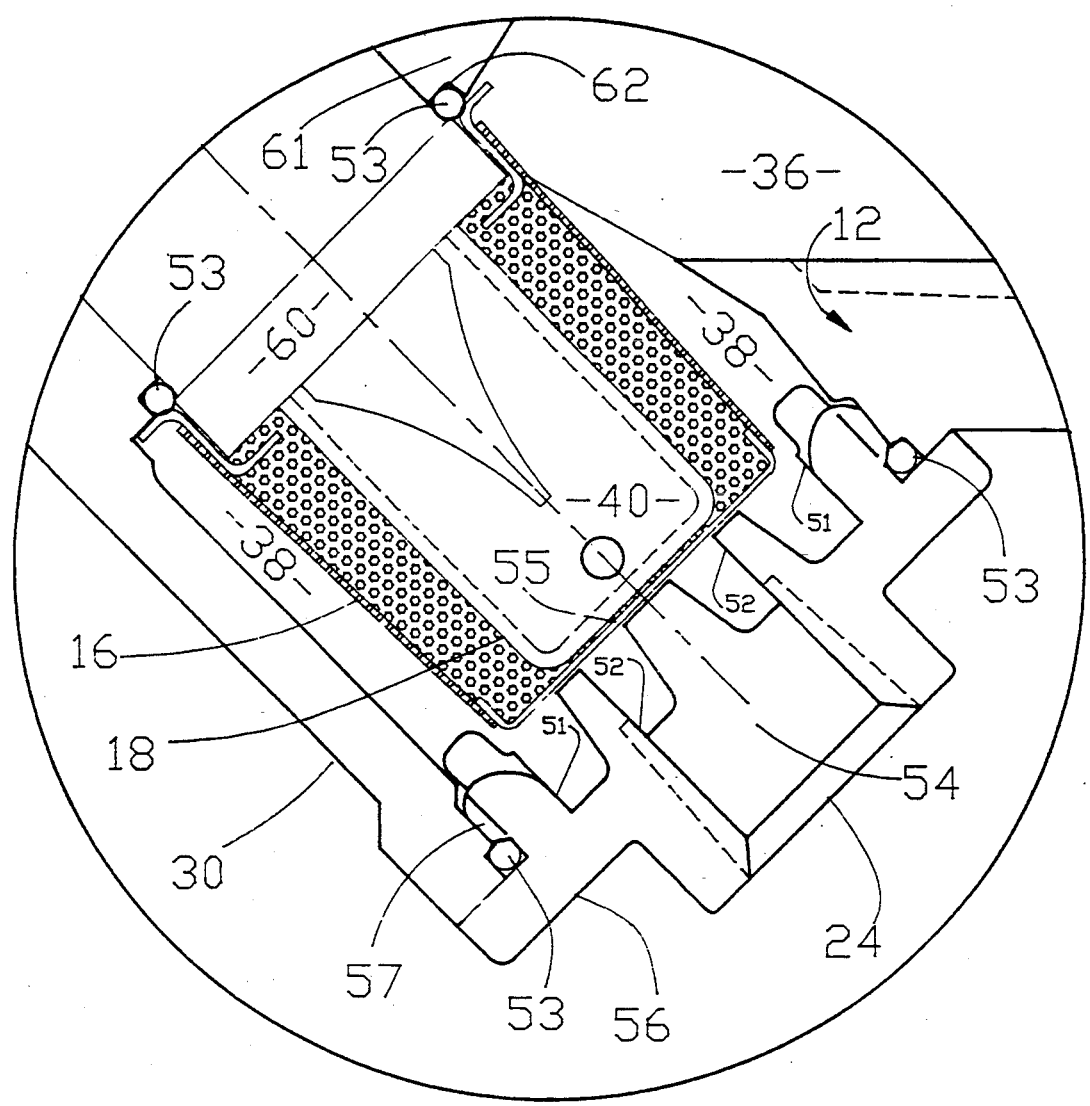
FIG. 2 is an enlarged cross-sectional view of the strainer assembly, depicting the strainer element and sealing ring.
Figure 3:
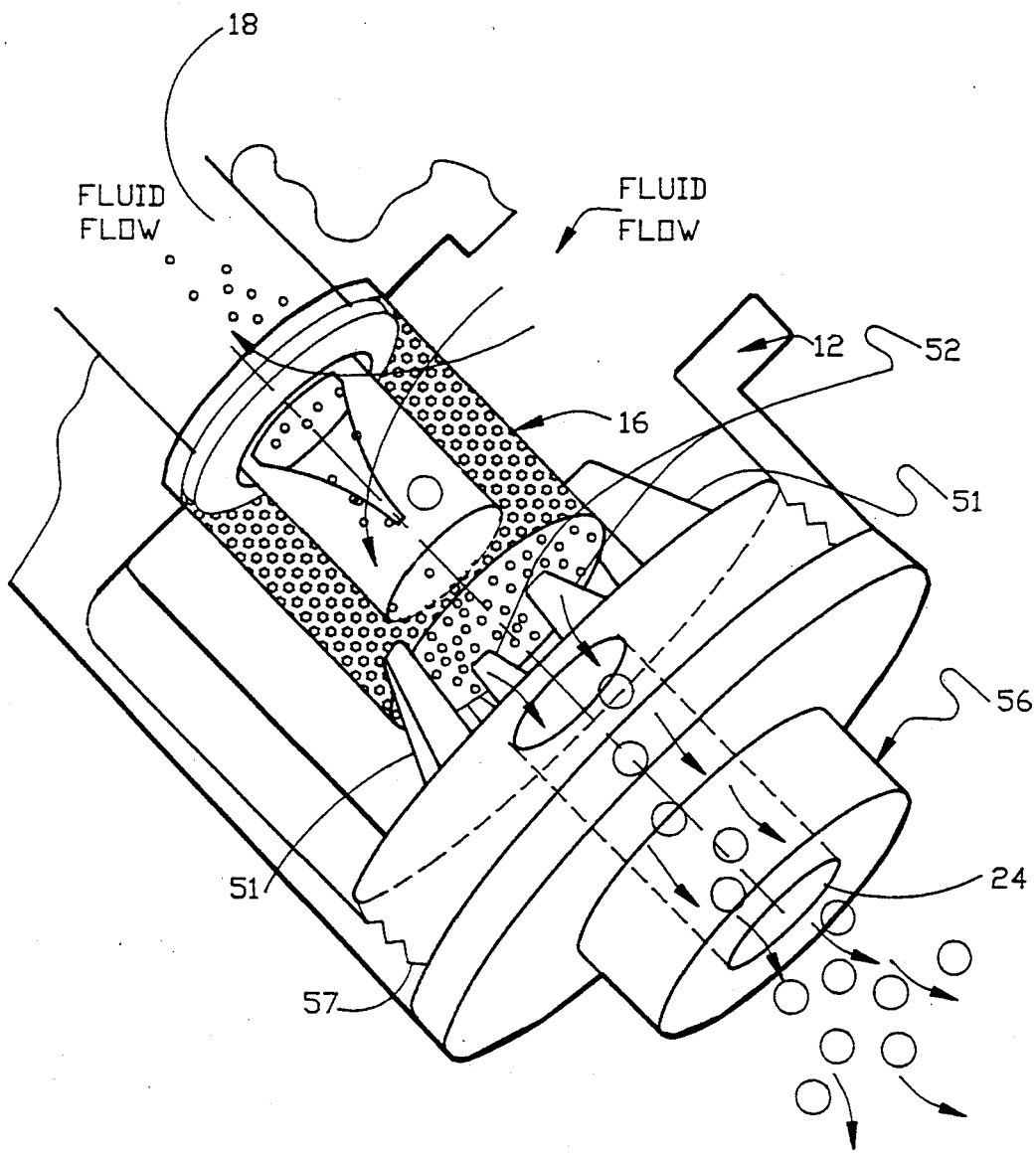
FIG. 3 is a general cut-away view of the valve and of the fluid flow into and out of the strainer assembly, illustrating the use of the blow down orifice to expel debris.

The removable strainer assembly 16 is depicted in greater detail in FIG. 2. The strainer assembly 16 includes a strainer 16a which is of cylindrical shape in the form of a cup and is mounted over the exposed surface of the removable flow control valve assembly 18. The strainer assembly 16 is held in place without the use of permanent mounting devices, and can be removed simply by removing the strainer cover 56. The bottom side 55 of the strainer assembly 16 is held in place by a set of lugs 51 & 52 that are integral to the strainer cover 56. The lugs 51 center the strainer to keep the strainer assembly 16 from shifting away from its center axis, and the lugs 52 form stop lugs to keep the strainer assembly 16 sealed with the valve body 12 and to keep it from separating from the flow control valve assembly 18. The strainer cover 56 is a removable cover, as by unscrewing, to allow removal of the removable strainer assembly 16 and the removable flow control valve assembly 18. The strainer cover 56 has outer threads that match the inner threads of the valve body at location 57. An O-ring seal 53 attached to the strainer cover 56 is used to prevent leakage between the strainer cover 56 and the valve body 12.

The other end of the strainer element is held in place simply by sliding the base of the strainer element between a flange 60 on the removable flow control valve assembly 18 and a flange 61 on the valve body 12, as depicted in FIG. 2. Lead in chamfers are beveled into the strainer centering lugs 51 and the flanges 60/61. The chamfers are cut so as to guide the strainer between the lugs and the flanges. An O-ring seal 53 is used to prevent debris from entering the removable flow control valve assembly 18. The strainer assembly 16 is constructed of a porous mesh that allows an appropriate amount of fluid to pass, depending on the type of flow, the amount of debris and the acceptable level of debris allowed in the end use.

This device is different from the prior art in that the fluid flow goes from outside to inside the circumference of the strainer assembly 16, resulting in the collection of debris on the outside surface of the strainer assembly 16, rather than on the inside where the debris can become lodged and more difficult to expel. Conventional devices involve a fluid flow in the opposite direction, resulting in the collection of debris on the inside of the strainer assembly. With this prior configuration, the strainer assembly itself needs to be removed in order to expel the debris. The configuration and orientation of the present strainer thus allows for easier flushing and cleaning of the strainer element because the debris can be expelled from the outer surface without removal of the assembly.

Once debris is collected on the outside of the strainer assembly 16, it can be expelled out of the strainer blow down orifice 24. This is accomplished by opening the plug 54 on the strainer cover 56, thus allowing fluid and debris to wash off the outer surface of the strainer and out of the strainer blow down orifice 24. A small ball valve (not shown) may be used in place of the plug 54 to facilitate back flushing the strainer assembly 16 in this manner if desired.

The removable flow control valve assembly 18 is a single cartridge that can be removed simply by removing the strainer cover 56 and the strainer assembly 16. It is held in place by the static force created by the strainer cover 56 and the strainer assembly 16. It is held in place on the side by the flow control valve channel 42 of the valve body 12. When inserted into the flow control valve channel, the removable flow control valve assembly 18 rests on the notch 62 of the valve body 12. The O-ring seal 53 prevents leakage between the valve body 12, the removable flow control valve assembly 18, and the strainer assembly 16.

A variety of flow control cartridges may be used in the removable flow control valve assembly 18 depending on the flow rate desired. Suitable automatic flow control cartridges are available from Griswold Controls, Irvine, Calif., which may be of the type disclosed for example in U.S. Pat. No. 3,752,183.

Once the fluid passes through the flow control valve, it exits the device through the outlet channel 44 and the outlet orifice 22 at a selected flow as determined by the cartridge used.

The preferred embodiment may also include a sensing port 26. The sensing port 26 comprises an opening on the bottom side 30 of the valve body 12 which is downwardly angled from the common axis at approximately a ninety degree angle and is located to the left of the removable flow control valve assembly 18. Any conventional closure device can be used, including a plug, which is not shown in these drawings.

While embodiments of the present invention have been shown and described, various modifications may be made without departing from the scope of the present invention, and all such modifications and equivalents are intended to be covered.

What is claimed is:

1. A fluid flow control device having a unitary body comprising
   A. a valve assembly comprising a removable flow control valve assembly contained within the body for receiving fluid flow and automatically controlling the fluid flow through said device,
   B. a removable strainer contained within the body around the valve assembly for straining fluid which flows through the device before fluid reaches the removable flow control valve assembly,
   C. a removable strainer cover for holding said strainer in place adjacent said removable flow control valve assembly,
   D. said strainer and said flow control valve assembly being housed within the same chamber, said strainer comprising an elongated cylinder in the shape of a cup with a closed side wall and closed end to encase the exposed inlet portion of said flow control valve assembly, and
   E. said strainer being arranged and configured so that fluid flows from the outside to the inside of said strainer prior to flowing through the flow control valve assembly, so that debris is collected on the outside of the closed side wall and closed end of said strainer for easy cleaning.

2. The device of claim 1 wherein said removable strainer cover comprises integral lugs to frictionally hold said strainer in place against said removable flow control valve assembly.

3. The device of claim 1 wherein there is a gap between said removable cover and said strainer, to allow fluid to pass through the closed end and sides of said strainer while blocking debris.

4. The device of claim 1 wherein there is a gap between said removable cover and said strainer, to allow fluid to pass through the closed end and sides of said strainer while blocking debris, and
   a first set of lugs attached to the removable cover to hold the strainer in place along its center axis, and
   a second set of lugs attached to the removable cover to hold the strainer against said valve assembly so as to provide a seal against debris entering said valve assembly.

5. The device of claim 1 wherein there is a gap between said removable cover and said strainer, to allow fluid to pass through the closed end and sides of said strainer while blocking debris, and
   wherein there is a port within said removable strainer cover to allow debris to be expelled without removing said cover.

6. A fluid flow control device comprising
   a unitary body having a channel,
   a removable flow control valve assembly contained within the channel for receiving fluid flow and automatically controlling the fluid flow through said device, and
   a removable strainer contained within the channel, the strainer having a closed side wall and a closed end to form the shape of a cup, whereby an open end of said strainer encircles an end of said flow control valve assembly for straining fluid before the fluid reaches the removable flow control valve assembly.

7. The fluid flow control device of claim 6 wherein the fluid flows through the strainer from outside the strainer to inside the strainer before the fluid flow encounters said flow control valve.

8. The fluid flow control device of claim 6 wherein the closed end of said strainer is perforated.

9. The fluid flow control device of claim 6 further comprising a removable strainer cover for holding said strainer in place adjacent said removable flow control valve assembly.

10. The fluid flow control device of claim 9 wherein the closed end of said strainer is perforated.

11. The fluid flow control device of claim 10 wherein there is a gap between said removable cover and said strainer, to allow fluid to pass through the closed end and sides of said strainer while blocking debris.

12. The fluid flow control device of claim 9 further comprising
   a port within said strainer cover to allow debris to be expelled without removing said cover.

13. The device of claim 10 wherein there is a gap between said removable cover and said strainer, to allow fluid to pass through the closed end and sides of said strainer while blocking debris, and
   wherein there is a port within said removable strainer cover to allow debris to be expelled without removing said cover.

* * * * *